(12) United States Patent
Zhang (10) Patent No.: US 11,698,262 B2
(45) Date of Patent: Jul. 11, 2023

(54) METHOD AND APPARATUS FOR GENERATING ROUTE PLANNING MODEL, AND STORAGE MEDIUM

(71) Applicant: BEIJING BAIDU NETCOM SCIENCE AND TECHNOLOGY CO., LTD., Beijing (CN)

(72) Inventor: Teng Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 17/221,309

(22) Filed: Apr. 2, 2021

(65) Prior Publication Data

US 2021/0223056 A1 Jul. 22, 2021

(30) Foreign Application Priority Data

Jun. 30, 2020 (CN) .......................... 202010621949.9

(51) Int. Cl.
*G01C 21/34* (2006.01)
*G01C 21/20* (2006.01)

(52) U.S. Cl.
CPC ......... *G01C 21/3484* (2013.01); *G01C 21/20* (2013.01); *G01C 21/343* (2013.01)

(58) Field of Classification Search
CPC .... G06N 3/0454; G06N 3/084; G06N 3/0445; G06N 3/0472; G06N 20/00; G06N 3/08;
(Continued)

(56) References Cited

U.S. PATENT DOCUMENTS

2019/0034794 A1 1/2019 Ogale et al.
2019/0291720 A1* 9/2019 Xiao ...................... G01S 13/89
(Continued)

FOREIGN PATENT DOCUMENTS

| CN | 106558058 A | 4/2017 |
| CN | 109429506 A | 3/2019 |

(Continued)

OTHER PUBLICATIONS

McGonagle, J., Shaikouski, G., Williams, C., Hsu, A., Khim, J. and Miller, A., Backpropagation | Brilliant Math & Science Wiki., 2022, https://brilliant.org/wiki/backpropagation/#:~:text=Backpropagation%2C%20short%20for%20%22backward%20propagation,to%20the%20neural%20network's%20weights (Year: 2022).*
Extended European Search Report for Application No. 21158981.7, dated Aug. 11, 2021, 10 pages.
Office Action for Chinese Application No. 202010621949.9, dated Jan. 7, 2022, 6 pages.
(Continued)

*Primary Examiner* — Kenneth J Malkowski
*Assistant Examiner* — Carville Albert Hollingsworth, IV
(74) *Attorney, Agent, or Firm* — Lippes Mathias LLP (57) ABSTRACT

A method and an apparatus for generating a route planning model and a storage medium are provided. The method for generating a route planning model includes: obtaining a target route data set associated with a target site; and determining a target route planning model of the target site with a site optimization object corresponding to the target site, based on the target route data set and a first route planning model; wherein the first route planning model is determined based on a set of historical route data through at least a first training, the set of historical route data being associated with a plurality of sites different from the target site and a first training optimization object for the first training corresponding to the plurality of sites.

12 Claims, 6 Drawing Sheets

(58) Field of Classification Search
CPC .......... G06N 5/003; G06N 3/088; G06N 3/02; G01C 21/3484; G01C 21/20; G01C 21/343; G01C 21/3685; G01C 21/3423; G01C 21/3675; G01C 21/165; G01C 21/3446; G01C 21/3476; G01C 21/3407; B60W 30/06; B60W 2420/42; B60W 2050/0005; B60W 2556/10; B60W 2554/402; B60W 2554/4029; B60W 2555/60; B60W 2554/20; B60W 2520/105; B60W 2552/15; B60W 60/001; B60W 2720/106; B60W 10/06; B60W 10/20; B60W 10/18; B60W 2050/0043; B60W 2520/10; B60W 2710/06; B60W 2710/18; B60W 30/10; B60W 40/00; B60W 40/076; B60W 40/107; B60W 60/00; B60W 2710/20; B62D 15/0285; G05D 1/0221; G05D 1/0246; G05D 1/0088; G05D 1/0231; G05D 1/0257; G05D 1/027; G05D 1/0278; G05D 2201/0213; G05D 1/00; G06Q 10/025; G06Q 50/30; G06Q 10/047; G06Q 10/08355; G06Q 10/04; B60Y 2300/10; B60Y 2300/06; G06T 2207/20084; G06T 2207/30241; G06T 2207/30264; G06T 7/70; G06T 17/05; G06V 20/56; G06V 20/588; G06V 10/462; G06V 20/586; G06K 9/6267; G06K 9/6201; G01S 2015/935; G01S 2013/9314; G01S 2015/932

See application file for complete search history.

(56) References Cited

U.S. PATENT DOCUMENTS

| | | | | |
|---|---|---|---|---|
| 2021/0004608 A1* | 1/2021 | Jaipuria | ................. | G06V 20/58 |
| 2021/0080967 A1* | 3/2021 | Pettinger | ............... | B60W 30/14 |

FOREIGN PATENT DOCUMENTS

| | | | | |
|---|---|---|---|---|
| CN | 109583384 A | 4/2019 | | |
| CN | 110795821 A | 2/2020 | | |
| CN | 111252061 A | 6/2020 | | |
| CN | 111260954 A | 6/2020 | | |
| CN | 111291253 A | 6/2020 | | |
| EP | 3660745 B1 * | 1/2022 | ............ | B60W 10/06 |
| JP | 2008292237 A | 12/2008 | | |
| JP | 2015150979 A | 8/2015 | | |
| JP | 2018063476 A | 4/2018 | | |
| JP | 2020152234 A | 9/2020 | | |
| WO | 2019045982 A1 | 3/2019 | | |

OTHER PUBLICATIONS

Liu Zhiqiang et al., "Research on Automatic Lane Change Method Based on Vehicle Network Information", Journal of Chongqing University of Technology, vol. 34, No. 4, Apr. 4, 2020, 7 pages.

Zhonghan Wang et al., "Automatic Parking Trajectory Planning Based on Recurrent Neural Network", Printed off the Internet, 4 pages.

Office Action for Japanese Application 2021-108835, dated Sep. 6, 2022, 3 pages.

* cited by examiner

METHOD AND APPARATUS FOR GENERATING ROUTE PLANNING MODEL, AND STORAGE MEDIUM

CROSS-REFERENCE TO RELATED APPLICATION

The present application is based upon and claims priority to Chinese Patent Application No. 202010621949.9, filed on Jun. 30, 2020, the entire contents of which are incorporated herein by reference.

FIELD

The present application relates to a field of autonomous driving technologies, and more particularly to a field of autonomous parking, and more particularly to a method and an apparatus for generating a route planning model, a device and a computer readable storage medium.

BACKGROUND

At present, various driving tasks may have been performed based on machine learning technology with the development of autonomous driving technologies. For example, a route planning such as autonomous parking may have been performed with machine learning technology. However, there may be different environmental factors for the places faced due to the diversity of scenes faced by autonomous parking. At this time, how to achieve the route planning for different places with less training data has become a research hotspot.

SUMMARY

According to a first aspect of the present disclosure, a method for generating a route planning model is provided. The method includes obtaining a target route data set associated with a target site. The method also includes determining a target route planning model of the target site with a site optimization object corresponding to the target site, based on the target route data set and a first route planning model, wherein the first route planning model is determined based on a set of historical route data through at least a first training, the set of historical route data being associated with a plurality of sites different from the target site and a first training optimization object for the first training corresponding to the plurality of sites.

According to a second aspect of the present disclosure, an apparatus for generating a route planning model is provided. The apparatus includes at least one processor; and a memory communicatively coupled to the at least one processor. The at least one processor is configured to obtain a target route data set associated with a target site; and determine a target route planning model of the target site with a site optimization object corresponding to the target site based on the target route data set and a first route planning model, wherein the first route planning model is determined based on a set of historical route data through at least a first training, the set of historical route data being associated with a plurality of sites different from the target site and a first training optimization object for the first training corresponding to the plurality of sites.

According to a third aspect of the present disclosure, a non-transitory computer readable storage medium having computer instructions stored thereon is provided. The computer instructions are configured to cause a computer to execute a method for generating a route planning model is provided. The method includes obtaining a target route data set associated with a target site. The method also includes determining a target route planning model of the target site with a site optimization object corresponding to the target site, based on the target route data set and a first route planning model, wherein the first route planning model is determined based on a set of historical route data through at least a first training, the set of historical route data being associated with a plurality of sites different from the target site and a first training optimization object for the first training corresponding to the plurality of sites.

It should be understood that, descriptions in Summary of the present application does not aim to limit a key or important feature in embodiments of the present application, and does not used to limit the scope of the present application. Other features of the present application will be easily understood by following descriptions.

BRIEF DESCRIPTION OF THE DRAWINGS

With reference to the accompanying drawings and the following detailed description, the above and other features, advantages and aspects of the embodiments of the present disclosure will become more apparent. In the drawings, the same or similar reference numbers indicate the same or similar elements, in which.

DETAILED DESCRIPTION

Description will be made below to example embodiments of the present application in conjunction with accompanying drawings, which includes various details of embodiments of the present application to facilitate understanding and should be regarded as merely examples. Therefore, it should be recognized by the skilled in the art that various changes and modifications may be made to the embodiments described herein without departing from the scope and spirit of the present application. Meanwhile, for clarity and conciseness, descriptions for well-known functions and structures are omitted in the following description.

In the descriptions of the embodiments of the present disclosure, the term "including" and similar terms should be understood as open-ended inclusion, that is, "including but not limited to". The term "based on" should be understood as "based at least in part on." The term "one embodiment" or "the embodiment" should be understood as "at least one embodiment." The terms "first", "second", etc. may refer to a different or identical object. The following may also include other explicit and implicit definitions.

In a learning-type autonomous parking scenario at low speeds, one type of solution for route planning is based on optimization algorithms. This type of solution may plan a more complex route, but it needs to rely on high-precision maps and high-precision positioning of the vehicle 110. One type of solution is based on the neural network, which may be utilized in low-cost, relatively closed and simple sites. For example, a traditional approach of end-to-end solutions based on deep neural networks includes inputting raw data from sensors (such as images and laser-point clouds) to a trained model (such as a neural network) for calculation and then directly outputting control parameters of the vehicle 110 (such as turning angles, control quantity of the brake and throttle, etc.). This type of solution does not rely on high-precision maps with a low cost. In autonomous parking applications, this type of solution faces a problem that the training model requires a lot of training data, for example, dozens of route data that are collected for one route in a site for dozens of times are required to obtain a stable cruise network, while the data set for new site or route must be collected again when the route or site changes and the training process is performed again, which may inevitably affect the user experience.

In order to at least partially solve one or more of the above-mentioned problems and other potential problems, a technical solution for generating a target route planning model is provided by embodiments of the present disclosure. In this solution, the concept of a site optimization object for a target site and a first training optimization object for a plurality of known sites is proposed. Here, the target site may refer to a site different from a plurality of known sites.

In the embodiments of the present disclosure, the target route planning model in the target site may be generated based on the first route planning model for a plurality of known sites. In this way, it is possible to optimize toward the site optimization object based on historical route data that already exist but is not related to the target site, which enables a target route data set containing a small amount of target route data being further processed. Therefore, the solution of the present disclosure may advantageously obtain the target route planning model of the target site in a simpler and effective manner, thereby alleviating the difficulty of obtaining a large number of training samples in the target site.

Hereinafter, the embodiments of the present disclosure will be described in detail with reference to the drawings.

Figure 1:
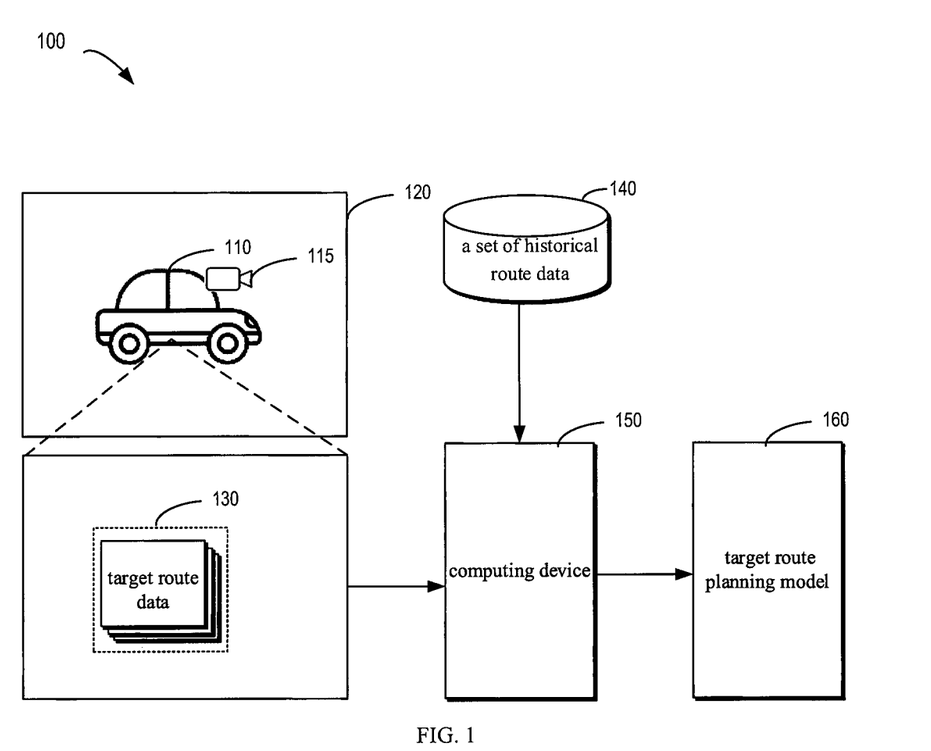
FIG. 1 illustrates a schematic diagram of an example environment 100 in which a route planning model may be generated in various embodiments of the present disclosure.

FIG. 1 illustrates a schematic diagram of an example environment 100 in which the embodiments of the present disclosure may be implemented. As shown in FIG. 1A, a vehicle 110 in the environment 100 is driving in a target site 120 such as a parking lot, where the parking lot may be an outdoor or indoor parking lot. In some embodiments, the vehicle 110 may be one equipped with a certain autonomous driving capability (for example, an autonomous parking capability) that may include but not limited to an assistant driving capability, a semi-autonomous driving capability, a high autonomous driving capability, or a full autonomous driving capability. The vehicle 110 may capture a plurality of real-time images of the surrounding environment through an image collecting device 115 fixed or installed thereon. The image collecting device 115 includes at least one sensor. In some embodiments, the image collecting device 115 may be one or more wide-angle or ultra-wide-angle cameras, and these cameras may capture a scene within 360 degrees of the surrounding environment. Alternatively, the image collecting device 115 may also employ a rotatable structure so as to rotatably detect real-time scenes outside the vehicle 110 in a plurality of directions. In some embodiments, the image collecting device 115 is configured with a L3 level autonomous driving sensors, which may include a forward wide-angle camera and four fisheye cameras. The L3 refers to a specific autonomous driving scenario where the whole autonomous driving system is capable of involving in the driving of the vehicle 110 and users may correct the errors caused by the vehicle 110 during the autonomous driving at any time in case that the vehicle 110 is dynamically traveling with the user's consent. Together with the corresponding trajectory point data of the driver's driving, target route data 130 is sent to the computing device 150 for further processing.

The computing device 150 may be a remote server or a cloud, which may be trained according to various data (including at least the target route data 130 and a set of historical route data set 140) and machine learning models. For example, the computing device 150 may map the trajectory point data of the driver's driving into each captured image, input the image into the machine learning model, and then output the trajectory point projected on this image. In other words, what is learned is the mapping of images to the trajectory points. The computing device 150 may execute the process described herein with reference to FIG. 2 to FIG. 6 to make the mapping more accurate and obtain a final target route planning model 160.

An example of the machine learning model may be a neural network model, such as a convolutional neural network model (CNN), a recurrent neural network (RNN), and so on. Before training with the target route data 130, the computing device 150 may use the set of historical route data 140 for pre-training, so as to reduce the amount of target route data 130 required for generating the final target route planning model 160. It may be understood that the set of historical route data 140 includes a plurality of route data that have been collected in a plurality of known sites for that are different from the target site 120. Therefore, the set of historical route data 140 may have been stored in the storage for the computing device 150. After the pre-training, the computing device 150 may use a small amount of target route data 130 for training, and then obtain the target route planning model 160. The target route planning model 160 may be deployed in a vehicle, and the real-time data collected by the image collecting device 115 are further utilized to realize the cruise function of the vehicle 110 for autonomous parking.

It should be understood that, the vehicle 110 may also include other sensors or detecting devices for autonomous driving in addition to the image collecting device 115. For example, the vehicle 110 may also include a LIDAR, a satellite positioning system, and an inertial measurement device. The LIDAR refers to a radar device that emits a laser beam to detect the location and/or velocity of an object, and its working principle is emitting a detecting signal (laser beam) to the object, comparing the received signal reflected from the object (target Echo) with the emitted signal, and performing proper processing to obtain relevant information of the object, such as one or more of distance, azimuth, height, speed, pose and even shape of the object. The satellite positioning system is not limited to the Global Positioning System (GPS), the Galileo satellite positioning system in Europe, the Beidou satellite positioning system in China, etc., which may be used in combination with the embodiments of the present disclosure. In addition, it should be understood that the environment 100 shown in FIG. 1 is only an example environment of the embodiment of the present disclosure, and is not used to limit the scope of the present disclosure.

Figure 2:
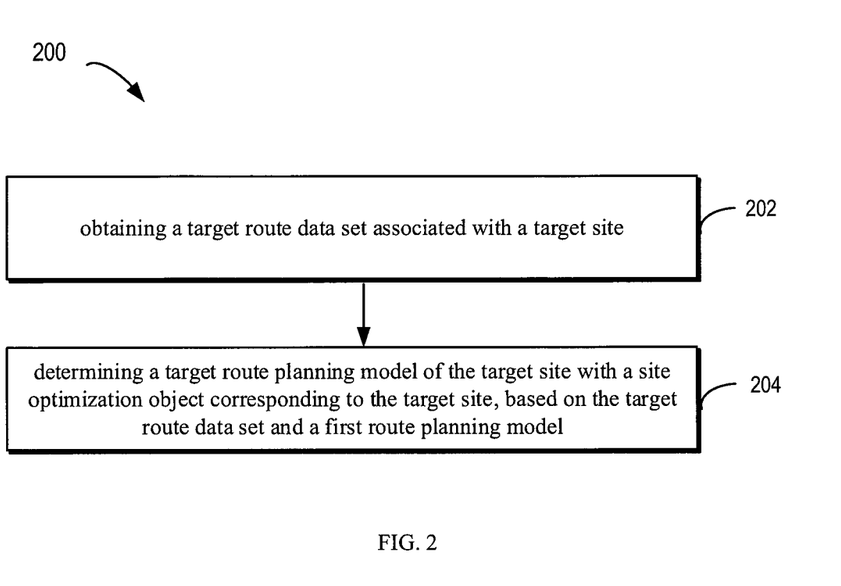
FIG. 2 illustrates a flowchart of a method 200 for generating a route planning model according to some embodiments of the present disclosure.

FIG. 2 illustrates a flowchart of a method 200 for generating a route planning model according to an embodiment of the present disclosure. To facilitate clear description, the method 200 of the embodiment of the present disclosure is described below with reference to the environment 100 of FIG. 1. It should be understood that the method 200 may be implemented in a computing device 150 such as a remote server or cloud, or implemented in part locally in the vehicle 110 and implemented in part in a remote server or cloud. It should be understood that the method 200 may also include additional actions not shown, and/or actions shown may be omitted. The scope of the present disclosure is not limited in this aspect. Hereafter, the method 200 executed by the computing device 150 as shown in FIG. 1 will be described.

At block 202, the computing device 150 obtains a target route data set associated with the target site 120.

In the descriptions of the embodiments of the present disclosure, the "target site 120" is sometimes referred to as the "target parking lot" in the present disclosure. The target site 120 may be such a site for which there is currently no route planning model, so its route planning model is to be generated.

The "target route data set" may be a set of a plurality of target route data for the target site 120 (for example, a specific parking lot). The "route data" may include image data (for example, a plurality of images) for a specific route in the site (for example, the target site 120) collected by the vehicle 110 (for example, through the image collecting device 115) and corresponding driving trajectory point data. The specific route may be a parking route such as a route from the entrance of the parking lot to a predetermined parking space, for example. In some embodiments, a plurality of target route data may be all collected by the vehicle 110 in the target site 120 and then sent to the computing device 150. In some embodiments, a part of the plurality of target route data is collected by the vehicle 110 in the target site 120 and sent to the computing device 150. The rest of the plurality of target route data are generated by the computing device 150 through the process described in detail below with reference to FIG. 4

At block 204, the computing device 150 determines the target route planning model 160 of the target site 120 with the site optimization object corresponding to the target site 120 based on the target route data set and a first route planning model, wherein the first route planning model is determined based on the set of historical route data through at least the first training. The set of historical route data is associated with a plurality of sites different from the target site 120 and the first training optimization object for the first training corresponds to the plurality of sites.

The computing device 150 may input the target route data set into the first route planning model, train the first route planning model with the site optimization object and further adjust the parameters for the first route planning model through the training, to achieve the site optimization on the specific target site 120 and finally obtain the optimized target route planning model 160. The site optimization object of the target site 120 may be configured to reduce a target route planning error of the target route planning model 160 in the target site 120. In other words, the site optimization object may make the target route planning model 160 perform route planning in the specific target site 120 so that the error between the predicted trajectory and the actual trajectory is smaller than a first threshold.

The accurate route planning in the target site 120 (for example, generating a trajectory for autonomous parking in the target parking lot) may be implemented by the vehicle 110 based on the target route planning model 160 and current route data for the target site 120 obtained by the image collecting device 115, which will be described in detail with reference to FIG. 7 below.

It should be understood that in an application scenario of generating the route planning model such as for autonomous parking, from the prospective of the computing device 150, in case that the computing device 150 performs training with a large number of data samples for a specific parking lot where the single vehicle 110 is located, the computing device 150 served for the plurality of vehicles 110 may perform a lot of calculations since the plurality of different vehicles 110 faces the plurality of different parking lots; and from the perspective of the vehicle 110, the user needs to drive the vehicle 110 to complete the collection of the target route data 130 in the target site 120, and a poor user experience may be caused in case that there are too many target route data 130 to be collected in order to form the target route data set. Therefore, there is a need for a suitable first route planning model during the process of determining the above target route planning model 160, thereby reducing the number of target route data samples that users need to collect for the target site 120 and reducing the computing overhead of computing device 150.

The "first route planning model" is sometimes referred to as a "pre-training model" or a "basic training model", which may be regarded as a basis for obtaining the target route planning model 160. Since the target site 120 is unknown to the vehicle 110 and the computing device 150, the basic training model should have a strong generalization ability in order to determine an accurate target route planning model 160 for the target site 120 with less target route data 130. The generalization ability refers to an ability of determining an accurate target route planning model 160 based on the basic training model with a small number of target route data 130 for all possible target sites 120. It may be understood that, in some embodiments, before the steps (which is sometimes referred to as an online process) of determining the target route planning model 160 at blocks 202 and 204, the first route planning model may be pre-trained by the computing device 150 (which is sometimes called an offline process) and is stored in the corresponding storage for use.

The first route planning model may be determined based on a historical route data set through at least a first training. The "set of historical route data" includes a plurality of route data that have been collected for one route in a plurality of known sites for a plurality of times that are different from the target site 120. The first route planning model is usually determined based on the set of historical route data through the training (i.e., the first training) to optimize toward a specific optimization object (i.e., the first training optimization object).

In order to have a strong generalization ability, the first training optimization object different from the site optimization object corresponds to the plurality of sites, which may cause the first route planning model being closer to all the plurality of sites (for example, the route planning error is smaller), rather that being accurate for a certain specific site (for example, the route planning error for a certain specific site may be allowed to exceed a tolerant threshold). Therefore, for each unknown target site 120, the first training optimization object is configured to reduce the number of target route data to be included in the target route data set. In some embodiments, the first training optimization object is configured to reduce a plurality of route planning errors of the first route planning model in the plurality of sites. In some embodiments, the first training optimization object may be configured to make the plurality of route planning errors between a plurality of predicted trajectories and a plurality of actual trajectories less than a second threshold, wherein the plurality of route planning errors are obtained by performing a plurality of route planning in a plurality of target sites with the first route planning model and the second threshold is greater than the first threshold for the site optimization object.

In other words, although the first route planning model trained through the above optimization object may not accurately plan the trajectory in a specific target site 120 (for example, the parking trajectory in the target parking lot), the requirements for the number of training samples in the target site 120 may be greatly reduced by using the first route planning model during the training process of generating the target route planning model 160. Hereafter, more details on determining the first route planning model will be described with reference to FIG. 4.

In some embodiments, the optimization object may be expressed by a loss function. For example, the site optimization object may be indicated by a target loss function corresponding to the target site 120, and the first training optimization object may be indicated by a sum of site loss functions corresponding to the plurality of sites. In one example, the loss function may be a cross-entropy loss function.

It should be understood that the above-mentioned specific definitions on terms are only for convenience of explanation, and are not used to limit the scope of the present disclosure. The embodiments of the present disclosure are applicable to any other physical environment that needs route planning, and are also applicable to any other data type and model type that may achieve the purpose of the present disclosure. In the embodiments of the present disclosure, all the trainings may be implemented by conventional training methods in a field of machine learning, such as a gradient descent method; the network structure of all the route planning models may be neural networks, such as convolutional neural networks, which are not limited by the embodiments of the present disclosure.

Therefore, the requirements for the number of target route data samples in the target site 120 may be reduced by the embodiments of the present disclosure. Further, based on the basic training model obtained from other known example route data sets of the plurality of sites, less route data for the target site 120 may be used to obtain a more accurate target route planning model 160 that are optimized for the target site 120. In this way, the user's driving experience can be improved while reducing the computing overhead of the server.

Figure 3:
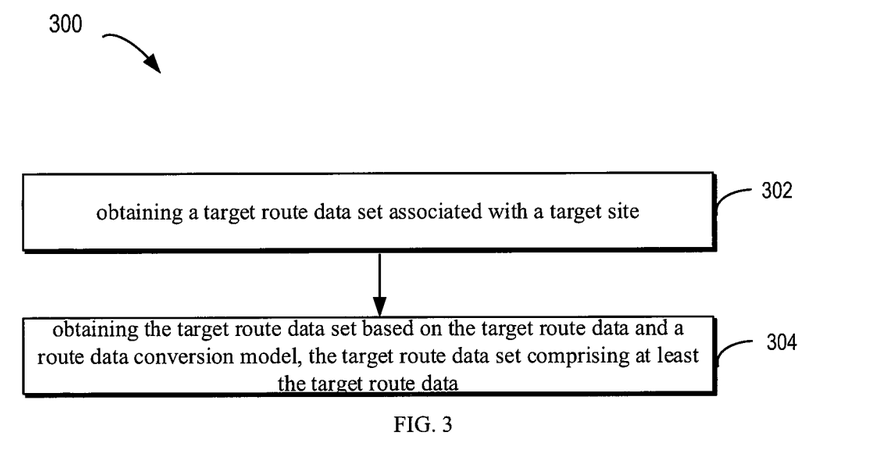
FIG. 3 illustrates a schematic diagram of a process 300 for obtaining a target route data set according to some embodiments of the present disclosure.

FIG. 3 illustrates a schematic diagram of a process 300 for obtaining a target route data set according to an embodiment of the present disclosure. For example, the process 300 may be regarded as an example implementation of block 202 in the method 200 shown in FIG. 2. It should be understood that the process 300 may also include additional actions not shown, and/or may omit actions shown. The scope of the present disclosure is not limited in this aspect.

At block 302, the computing device 150 obtains the target route data 130 associated with the target site 120.

As discussed above, the target route data set that needs to be obtained includes a plurality of target route data, and a part of the target route data 130 may be collected in the target site 120 via the vehicle 110 operated by the user (for example, target route data 130 are collected for one route in a site for 5 times) and then sent to the computing device 150 such as a remote server. The computing device 150 may receive these target route data for further processing. It may be understood that the number of target route data samples collected at block 302 may be less than the number of the target route data in the target route data set used in the method 200.

At block 304, the computing device 150 obtains the target route data set based on the above target route data 130 and a route data translation model. The target route data set includes at least the above target route data 130.

As described above, the target route data may include image data. Therefore, a smaller number of target route data may be translated into a larger number of target route data samples with the route data translation model such as an image augmentation model, to generate a desired target route data set.

It may be understood that the final target route planning model 160 that are trained with the target route data collected under a single environmental condition will affect the accuracy of the target route planning model 160 under different other environmental conditions, since different environmental conditions such as light will have a greater impact on the collected image data. For example, the route planned on a rainy day may be less accurate by the target route planning model 160 that are trained with the collected target route data on a sunny day.

Therefore, in some embodiments, the route data translation model may translate the target route data collected under a single environmental condition into a plurality of translated target route data under different environmental conditions. The target route data set is then consisted of the collected target route data and the translated plurality of target route data. For example, the route data translation model may translate one target route data set collected on a sunny day into 6 target route data sets translated under cloudy, rainy, snowy, evening, night and backlighting conditions, thereby increasing the data amount under different environmental conditions.

It may be understood that the route data translation model may use various generative Adversarial networks (GAN) in a field of Image-to-Image Translation, for example, a cyclic GAN (CycleGAN), a DRIT++ (Diverse Image-to-Image Translation via Disentangled Representations), etc. . . . Similar to the first route planning model, the route data translation model may be pre-trained in the offline process. For example, the route data translation model may be trained with an image data training set composed of various image data collected under the sunny, cloudy, rainy, snowy, evening, night and backlighting conditions. In some embodiments, the route data translation model is trained with image data related to the target site 120 (for example, various parking lots), to further improve the accuracy of the route data translation model.

In some embodiments, since the environmental conditions when the target route data is collected may not be the predetermined environmental conditions, the route data translation model obtained in advance may include a set of route data translation sub-models. The set of route data translation sub-models respectively correspond to different environmental conditions, for example, sunny, cloudy, rainy, snowy, evening, night and backlighting conditions. After receiving the target data, the computing device 150 determines the target environmental condition (for example, evening) where the target route data is located. Subsequently, the computing device 150 determines one route data translation sub-model (for example, a translation sub-model from evening to other environmental conditions) from the set of route data translation sub-models corresponding to the target environmental condition (for example, evening) based on the target environmental condition. Next, the computing device 150 obtains the target route data set based on the target route data and the determined route data translation sub-model (for example, a translation sub-model from evening to other environmental conditions). In this way, the computing device 150 may perform the translation by one route data translation sub-model that matches the target route data, to obtain the target route data set.

Therefore, the requirements for the number of target route data samples in the target site 120 may be further reduced by the embodiments of the present disclosure. For example, a larger number of samples in the target route data set may be achieved by the route data translation model based on a small number of the actually collected target route data. Moreover, the obtained target route data set may include the target route data under different environmental conditions. In this way, the user's driving experience may be further improved and the computing overhead of the server may be reduced while the accuracy of the final target route planning model 160 under different environmental conditions may be improved. The target route planning model 160 may be determined even only with the target route data collected for one route in the specific target site 120 for 5 times when the vehicle 110 is driven by the user.

Figure 4:
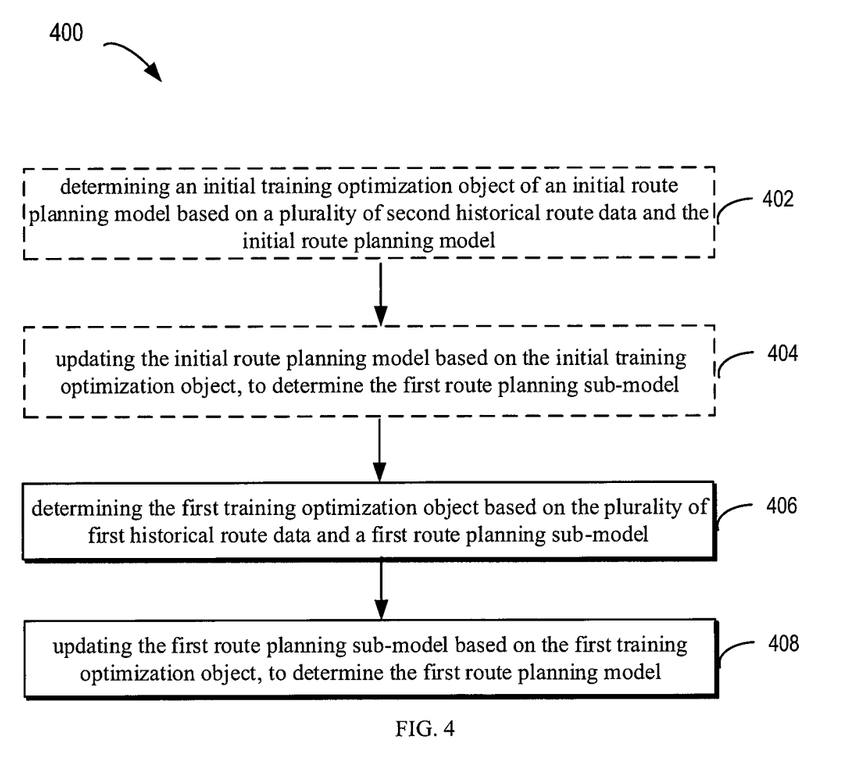
FIG. 4 illustrates a schematic diagram of a process 400 for determining a first route planning model according to some embodiments of the present disclosure.

FIG. 4 illustrates a schematic diagram of a process 400 for determining a first route planning model according to an embodiment of the present disclosure. For example, the process 400 may be regarded as an example implementation of determining the first route planning model utilized by the block 204 of the method 200 as shown in FIG. 2. It should be understood that the process 400 may also include additional actions not shown and/or may omit actions shown. The scope of the present disclosure is not limited in this aspect.

As described above, the first route planning model is determined based on the set of historical route data through at least the first training. It may be understood that the first training is performed by the computing device 150 in advance before the process of determining the target route planning model 160 for the target site 120. The training process of the first route planning model will be described in detail below.

The first training may include the steps indicated by blocks 406 and 408.

At block 406, the computing device 150 determines the first training optimization object based on the plurality of first historical route data and a first route planning sub-model. The plurality of first historical route data may be included in the set of historical route data.

The set of historical route data may include a plurality of route data collected for one route in the plurality of known sites for a plurality of times. In one example, assuming that in the set of historical route data, O route date have been collected for one route in each of the N sites for O times (that is, there are a N*O route data in total), the computing device 150 may randomly select M route data from the O route data for the first training. In other words, in this example, the plurality of first historical route data includes N*M route data. This N*M route data may be trained for back propagation in a task $T_i$ (i=1, 2, 3 . . . N) to be trained for N sites.

In order to train the first route planning model with a strong generalization ability, N generally needs to be greater than a predetermined value, for example, N is 50. M may be predetermined (for example, a specific value greater than or equal to 55), or may be determined based on the comparison between the error with the second threshold described above during the training process.

The first route planning sub-model may be the adjusted model for N sites, and it is may be determined that the first training optimization object is indicated by a sum of site loss functions corresponding to N sites (i.e., $\Sigma_{i=1,2,3\ldots N} L_{T_i} f(\theta'_i)$), where f is the network structure adopted by the model, L is the loss function, and $\theta'_i$ is the adjusted parameter for the site i of the route planning sub-model. The $\theta'_i$ is input into the network f during forward propagation. It may be understood that the computing device 150 that serves for a plurality of vehicles may have stored a plurality of route data that are previously collected by these vehicles thereon, and have already adjusted the model with these route data. Therefore, in the first training, the computing device may directly determine the model after identical degree of adjustment (for example, going through the same number of iterations and using the same optimization object) as the first route planning sub-model, and obtain the $\theta'_i$. Alternatively, the computing device 150 may directly determine the first route planning sub-model with the set of historical route data through the second training and obtain the $\theta'_i$, which will be described below with reference to blocks 402 and 404. In other words, in this case, the training process of the first route planning model will include two different training processes.

At block 408, the first route planning sub-model is updated by the computing device 150 based on the first training optimization object, to determine the first route planning model.

After determining the first training optimization object, migration training is performed by the computing device 150 with N*M route data at this time, to optimize toward the first training optimization object and further determine the first route planning model. In one example, the migration training may be to perform the gradient descent as shown in Equation 1:

$$\theta'' = \theta - \beta \nabla_\theta \Sigma_{i=1,2,3\ldots N} L_{T_i} f(\theta'_i) \quad \text{Equation 1}$$

where β is a hyper-parameter learning rate, which may be predetermined based on existing or existing experiences; and θ is a parameter to be learned. In other words, the back propagation calculates the gradient relative to θ and update the θ. The first training operation may be continuously performed in a plurality of rounds, so as to obtain the updated θ″ and further determine the first route planning model.

As discussed above, the first route planning sub-model in some embodiments may be determined through the second training, where the second training may include, for example, the steps indicated by the dashed blocks 402 and 404 in FIG. 4.

At block 402, an initial training optimization object of an initial route planning model may be determined by the computing device 150 based on a plurality of second historical route data and the initial route planning model. The plurality of second historical route data may be included in the set of historical route data.

It may be understood that there is no limitation on how to obtain the initial route planning model, and the initial route planning model may be a model without any training or a model that has undergone other initial trainings.

The above example of the set of historical route data with a total of N*O route data is referred again for explanation. For each site, the computing device 150 may randomly select m route data from the O route data for the second training. In some embodiments, the m route data and the M route data are different from each other, while in other embodiments, the m route data are the same as the M route data. In some embodiments, m is less than M. For example, m may be a predetermined fraction of M (for example, 1/11, that is, if M=55, m=5 is selected). In one example, the O route data is consisted of the m routes data and M route data, that is, O=M+m. The N*m route data may form a matrix, which may be regarded as the task to be trained $T_i$ (i=1, 2, 3 ... N), where each task $T_i$ includes the m route data.

The initial training optimization object may be determined to be indicated by a target loss function (i.e., $L_{T_i}(f_\theta)$) corresponding to the site I, where f is the network structure adopted by the model, L is the loss function, and θ is input into the network f during forward propagation.

At block 404, the initial route planning model may be updated by the computing device 150 based on the initial training optimization object, to determine the first route planning sub-model.

After determining the initial training optimization object, second training is performed by the computing device 150 with N*M route data at this time, to optimize toward the initial training optimization object and further determine the first route planning sub-model. In one example, the second training may be to perform the gradient descent as shown in Equation 2:

$$\theta'_i = \theta - a\nabla_\theta L_{T_i}(f_\theta)$$ Equation 2 where a is a hyper-parameter learning rate, which may be predetermined based on existing or existing experiences. Generally, a is set to be smaller than β in the Equation 1. Similar to the Equation 1, θ is a parameter to be learned. The second training operation may be continuously performed in a plurality of rounds, so as to determine the first route planning sub-model and obtain the updated $\theta'_i$ for each site i.

Therefore, the basic training model with a strong generalization ability may be obtained through two training processes with different optimization objects in the embodiments of the present disclosure, which is served as a good basis for subsequently obtaining an accurate target route planning model 160 for the target site(s) 120.

Figure 5:
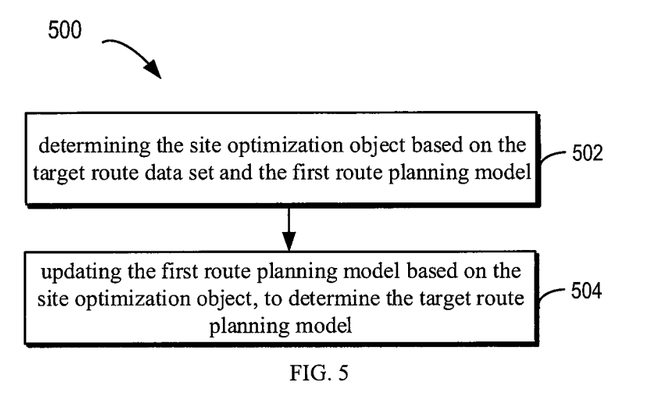
FIG. 5 illustrates a schematic diagram of a process 500 for determining a target route planning model according to some embodiments of the present disclosure.

FIG. 5 illustrates a schematic diagram of a process 500 for determining a target route planning model 160 according to an embodiment of the present disclosure. For example, the process 500 may be regarded as an example implementation of block 204 in the method 200 shown in FIG. 2. It should be understood that the process 500 may also include additional actions not shown and/or may omit actions shown. The scope of the present disclosure is not limited in this aspect.

At block 502, the site optimization object is determined by the computing device 150 based on the target route data set and the first route planning model. Specifically, the target route planning model 160 is obtained based on the first route planning model by training with the target route data set containing a small number of samples. During the training, one target route data in the target route data set may be input into the first route planning model to obtain the predicted trajectory. The error between the predicted trajectory and the actual acquired trajectory may be determined. The site optimization object may indicate this error. As described above, the site optimization object may be indicated by a target loss function corresponding to the target site 120.

At block 504, the first route planning model is then updated by the computing device 150 based on the site optimization object to determine the target route planning model 160. As described above, the site optimization object of the target site 120 may be configured to make the error of the optimized target route planning model 160 for route planning in the specific target site 120 less than a threshold. The computing device 150 continuously updates the parameters of the first route planning model, toward a direction that makes the error between the predicted trajectory and the actual trajectory smaller, to obtain the updated first route planning model. For example, the above updating may be performed based on a gradient descent method similar to the above Equation 2. The training operation may be continuously performed in an iterative manner in a plurality of training rounds to update the parameters of the first route planning model, so as to determine the target route planning model 160.

In the embodiment of the present disclosure, a more accurate target route planning model 160 may be obtained under the condition of using only a target route data set containing a small number of training samples. In this way, the target route planning model 160 may be effectively obtained by using only a small number of collected target route data for a new target site 120.

Figure 6:
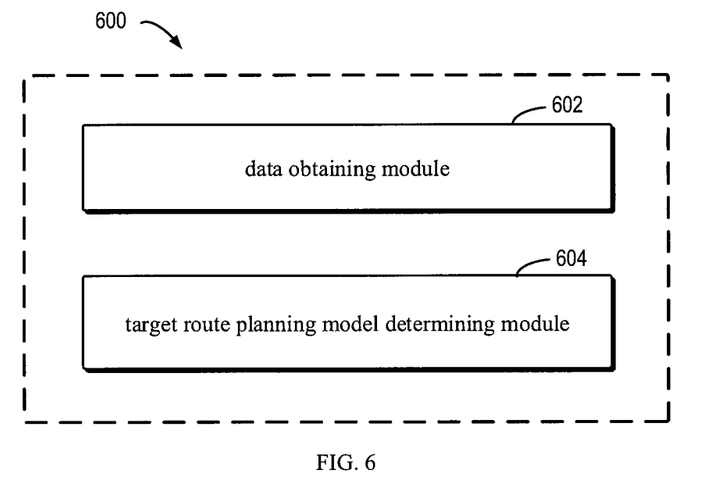
FIG. 6 illustrates a schematic block diagram of an apparatus 600 for generating a route planning model according to some embodiments of the present disclosure.

FIG. 6 illustrates a schematic block diagram of an apparatus 600 for generating a route planning model according to an embodiment of the present disclosure. As shown in FIG. 6, the apparatus 600 may include a data obtaining module 602 configured to obtain a target route data set associated with a target site 120.

The apparatus 600 may also include a target route planning model determining module 604 configured to determine a target route planning model of the target site 120 with a site optimization object corresponding to the target site 120 based on the target route data set and a first route planning model, wherein the first route planning model is determined based on a set of historical route data through at least a first training. The set of historical route data is associated with a plurality of sites different from the target site 120 and a first training optimization object for the first training corresponds to the plurality of sites.

In some embodiments, the site optimization object is configured to reduce a target route planning error of the target route planning model in the target site, and the first training optimization object is configured to reduce a plurality of route planning errors of the first route planning model in the plurality of sites.

In some embodiments, the site optimization object is indicated by a target loss function corresponding to the target site 120, and the first training optimization object is indicated by a sum of target loss functions corresponding to the plurality of sites.

In some embodiments, the set of historical route data includes a plurality of first historical route data, and the target route planning model determining module 604 also includes: a first training optimization object determining module, configured to determine the first training optimization object based on the plurality of first historical route data and a first route planning sub-model; and a first route planning model determining module, configured to update the first route planning sub-model based on the first training optimization target, to determine the first route planning model.

In some embodiments, the set of historical route data further includes a plurality of second historical route data, and the first route planning sub-model is determined through a second training by the target route planning model determining module 604, wherein the target route planning model determining module 604 further includes: an initial training optimization target determining module, configured to determine an initial training optimization object of an initial route planning model based on the plurality of second historical route data and the initial route planning model; and a first route planning sub-model determining module, configured to update the initial route planning model based on the initial training optimization target, to determine the first route planning sub-model.

In some embodiments, the data obtaining module 602 further includes: a target route data obtaining module configured to obtain target route data associated with the target site 120; and a target route data set obtaining module configured to obtain the target route data set based on the target route data and a route data translation model, the target route data set comprising at least the target route data.

In some embodiments, the route data translation model includes a set of route data translation sub-models, each of the set of route data translation sub-models corresponds to a different environmental condition, and the data obtaining module 602 further includes: a target environmental condition determining module, configured to determine a target environmental condition where the target route data is located; and a route data translation model determining module, configured to determine one route data translation sub-model from the set of route data translation sub-models corresponding to the target environmental condition based on the target environmental condition; wherein the target route data set obtaining module is further configured to obtain the target route data set based on the target route data and the determined route data translation sub-model.

In some embodiments, the target route planning model determination module 604 further includes: a site optimization object determining module configured to determine the site optimization object based on the target route data set and the first route planning model; wherein the target route planning model determining module 604 is further configured to update the first route planning model based on the site optimization object, to determine the target route planning model.

Figure 7:
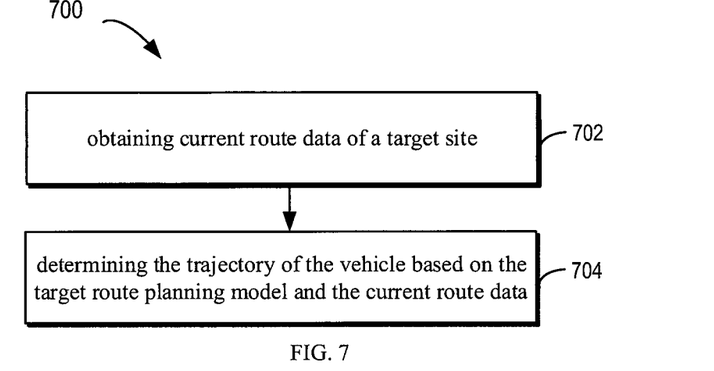
FIG. 7 illustrates a schematic diagram of a method 700 for determining a trajectory of a vehicle according to some embodiments of the present disclosure.

FIG. 7 illustrates a schematic diagram of a method 700 for determining a trajectory of a vehicle according to an embodiment of the present disclosure. According to this embodiment, the target route planning model 160 may be used to determine the trajectory of the vehicle 110 in the target site 120. In one example, the trajectory for autonomous parking in a target parking lot may include a trajectory point on a route from the entrance of the parking lot to the predetermined parking space. Specifically, the process for determining the trajectory of the vehicle 110 may be performed at the vehicle 110, or implemented in part locally in the vehicle 110 and implemented in part in a remote server or cloud, or completely executed in a remote server or cloud. Hereinafter, the process for determining the trajectory of the vehicle 110 is performed at the vehicle 110 for description.

At block 702, the vehicle 110 obtains current route data of the target site 120 by at least one sensor of the vehicle. Specifically, the vehicle 110 may obtain the trained target route planning model 160 from the computing device 150 such as a remote server. It may be understood that, the vehicle 110 may also include a central processing unit (CPU) in addition to at least one sensor. The CPU may perform various appropriate actions and processing to determine the trajectory of the vehicle 110 based on computer program instructions stored in a read-only memory (ROM) or loaded from a storage unit into a random access memory (RAM). After the vehicle 110 is driven to the target site 120, at least one sensor (for example, the image collecting device 115) may be used to obtain current route data of the target site 120.

At block 704, the trajectory of the vehicle 110 is determined based on the target route planning model 160 and the current route data. Specifically, the current route data includes a plurality of images for the target site 120. The a plurality of images are input into the target route planning model 160 and the trajectory points of the target site 120 are output by the target route planning model 160 after calculation. Using these trajectory points, control parameters such as steers, throttles, and brakes of the vehicle 110 may be calculated in subsequent processing so as to instruct corresponding actuators of the vehicle to perform corresponding actions.

In some embodiments, as a number of autonomous parking of the vehicle 110 in the target site 120 increases, the current route data collected each time may be used to update the existing target route planning model 160. In this way, the accuracy of the target route planning model 160 may be further improved.

Figure 8:
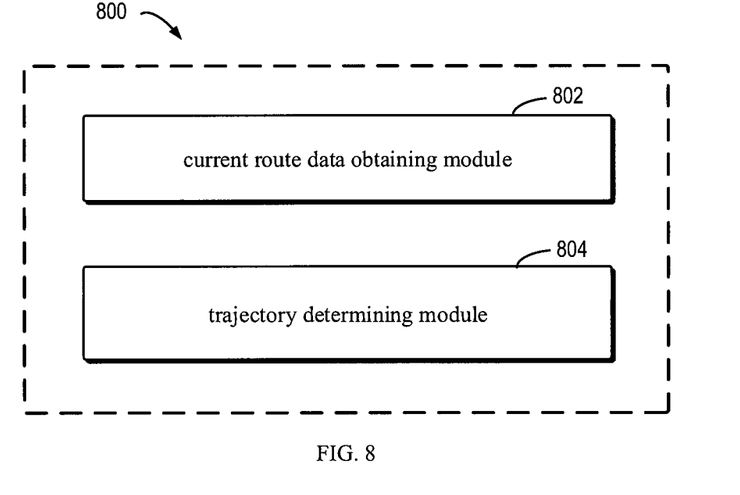
FIG. 8 illustrates a schematic block diagram of a vehicle 800 according to some embodiments of the present disclosure.

FIG. 8 illustrates a schematic block diagram of a vehicle 800 according to an embodiment of the present disclosure. The vehicle 800 is a specific example that may be used to implement the vehicle 110 in FIG. 1. As shown in FIG. 7, the vehicle 800 includes: a current route data obtaining module 802 configured to obtain current route data of a target site 120 by at least one sensor of the vehicle. The vehicle 800 also includes a trajectory determining module 804 configured to determine the trajectory of the vehicle 800 based on the target route planning model determined according to the method described with reference to FIG. 2 to FIG. 5 and the current route data.

According to embodiments of the present application, the present application also provides an electronic device and a readable storage medium.

Figure 9:
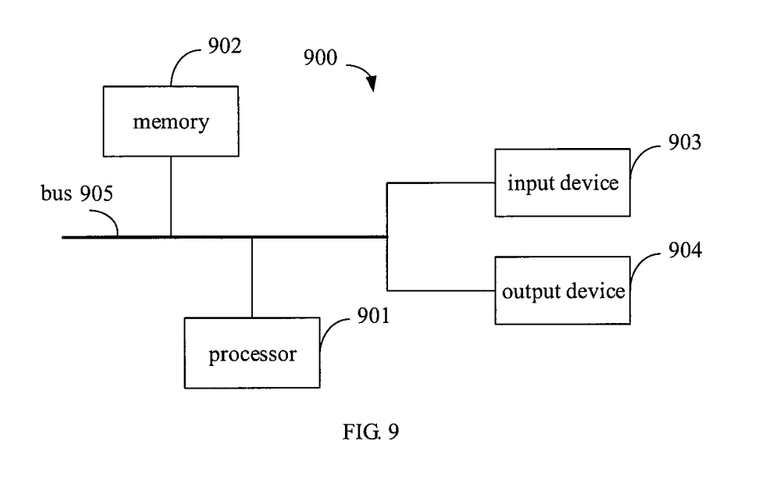
FIG. 9 illustrates a block diagram of an electronic device 900 capable of implementing various embodiments of the present disclosure.

FIG. 9 is a block diagram of an electronic device 900 for generating a route planning model according to embodiments of the present application. The electronic device aims to represent various forms of digital computers, such as a laptop computer, a desktop computer, a workstation, a personal digital assistant, a server, a blade server, a mainframe computer and other suitable computers. The electronic device may also represent various forms of mobile devices, such as a personal digital processing, a cellular phone, a smart phone, a wearable device and other similar computing devices. The components, connections and relationships of the components, and functions of the components illustrated herein are merely examples, and are not intended to limit the implementation of the present application described and/or claimed herein.

As illustrated in FIG. 9, the electronic device 900 includes: one or more processors 901, a memory 902, and interfaces for connecting various components, including a high-speed interface and a low-speed interface. Various components are connected to each other with different buses, and may be mounted on a common main board or mounted in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if necessary. Similarly, a plurality of electronic devices may be connected, and each electronic device provides a part of necessary operations (for example, as a server array, a group of blade servers, or a multiprocessor system). In FIG. 9, one processor 901 is taken as an example.

The memory 902 is a non-transitory computer readable storage medium provided by the present application. The memory is configured to store instructions executable by at least one processor, to cause the at least one processor to execute a method for generating a route planning model provided by the present application. The non-transitory computer readable storage medium provided by the present application is configured to store computer instructions. The computer instructions are configured to enable a computer to execute the method for generating a route planning model provided by the present application.

As the non-transitory computer readable storage medium, the memory 902 may be configured to store non-transitory software programs, non-transitory computer executable programs and modules, such as program instructions/modules (such as, the data obtaining module 602 and target route planning model determining module 604 illustrated in FIG. 6) corresponding to the method for generating a route planning model according to embodiments of the present application. The processor 901 executes various functional applications and data processing of the server by operating non-transitory software programs, instructions and modules stored in the memory 902, that is, implements the method for controlling the vehicle according to the above method embodiment.

The memory 902 may include a storage program region and a storage data region. The storage program region may store an application required by an operating system and at least one function. The storage data region may store data created based on usage of the electronic device for generating a route planning model. In addition, the memory 902 may include a high-speed random access memory, and may also include a non-transitory memory, such as at least one disk memory device, a flash memory device, or other non-transitory solid-state memory device. In some embodiments, the memory 902 may optionally include memories remotely located to the processor 901 which may be connected to the electronic device capable of generating a route planning model via a network. Examples of the above network include, but are not limited to, the Internet, an intranet, a local area network, a mobile communication network and combinations thereof.

The electronic device capable of generating a route planning model may also include: an input device 903 and an output device 904. The processor 901, the memory 902, the input device 903, and the output device 904 may be connected through a bus 905 or in other means. In FIG. 9, the bus 905 is taken as an example.

The input device 903 may receive input digitals or character information, and generate key signal input related to user setting and function control of the electronic device capable of generating a route planning model, such as a touch screen, a keypad, a mouse, a track pad, a touch pad, an indicator stick, one or more mouse buttons, a trackball, a joystick and other input device. The output device 904 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be a touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit the data and the instructions to the storage system, the at least one input device and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as machine readable signals. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

According to the technical solutions of the embodiments of the present application, the requirements for the number of target route data samples in the target site 120 may be reduced. Further, a more accurate target route planning model 160 that are optimized for the target site 120 may be obtained with a small number of route data for the target site 120 based on the basic training model obtained from other known example route data set of a plurality of sites. In this way, the user's driving experiences may be improved while reducing the computing overhead of the server.

It should be understood that, steps may be reordered, added or deleted by utilizing flows in the various forms illustrated above. For example, the steps described in the present application may be executed in parallel, sequentially or in different orders, so long as desired results of the technical solution disclosed by the present application may be achieved without limitation herein.

The above detailed implementations do not limit the protection scope of the present application. It should be understood by the skilled in the art that various modifications, combinations, sub-combinations and substitutions may be made based on design requirements and other factors. Any modification, equivalent substitution and improvement made within the spirit and the principle of the present application shall be included in the protection scope of present application.

What is claimed is:

1. A method for generating a target route planning model, comprising:
    obtaining, by a computing device in a vehicle, a target route data set associated with a target site; and
    in response to inputting target route data in the target route data set into a first route planning model, determining by the computing device a first error between a predicted trajectory outputted by the first route planning model and an actual trajectory corresponding to the target route data;
    updating by the computing device a parameter of the first route planning model until the first error is smaller than a first threshold; and
    determining by the computing device the updated first route planning model as the target route planning model of the target site, wherein the target route planning model is configured to output a trajectory of the vehicle for autonomous parking in the target site;
    wherein the first route planning model is pre-trained based on a set of historical route data, the set of historical route data being associated with a plurality of sites different from the target site and comprising a plurality of first historical route data;
    wherein the first route planning model is determined by:
    in response to inputting the plurality of first historical route data into a first route planning sub-model, determining a second error between a predicted trajectory outputted by the first route planning sub-model and an actual trajectory corresponding to each first historical route data;
    updating a parameter of the first route planning sub-model in a first gradient descent way until the second error is smaller than a second threshold; and
    determining the updated first route planning sub-model as a the first route planning model;
    wherein the method further comprises:
    obtaining current route data of the target site by at least one sensor of the vehicle;
    determining a trajectory for autonomous parking of the vehicle in the target site by inputting the current route data to the target route planning model; and
    controlling steers, throttles, and brakes of the vehicle based on the determined trajectory and parking the vehicle in a predetermined parking space of the target site.

2. The method of claim 1, wherein the first error is indicated by a target loss function corresponding to the target site, and the second error is indicated by a sum of site loss functions corresponding to the plurality of sites.

3. The method of claim 1, wherein the set of historical route data further comprises a plurality of second historical route data, and the first route planning sub-model is determined by:
    in response to inputting the plurality of second historical route data into an initial route planning model, determining a third error between a predicted trajectory outputted by the initial route planning model and an actual trajectory corresponding to each second historical route data; and
    updating a parameter of the initial route planning model in a second gradient descent way until the third error is smaller than a third threshold; and
    determining the updated initial route planning model as the first route planning sub-model.

4. The method of claim 1, wherein obtaining the target route data set comprises:
    obtaining target route data associated with the target site; and
    obtaining the target route data set based on the target route data and a route data translation model, the target route data set comprising at least the target route data.

5. The method of claim 4, wherein the route data translation model comprises a set of route data translation sub-models, each of the set of route data translation sub-models corresponds to a different environmental condition, and obtaining the target route data set further comprises:
    determining a target environmental condition where the target route data is located;
    determining one route data translation sub-model from the set of route data translation sub-models corresponding to the target environmental condition based on the target environmental condition; and
    obtaining the target route data set based on the target route data and the determined route data translation sub-model.

6. An apparatus for generating a target route planning model, included in a vehicle, the apparatus comprising:
    at least one processor; and
    a memory communicatively coupled to the at least one processor,
    wherein the at least one processor is configured to:
    obtain a target route data set associated with a target site;
    in response to inputting target route data in the target route data set into a first route planning model, determine a first error between a predicted trajectory outputted by the first route planning model and an actual trajectory corresponding to the target route data;
    update a parameter of the first route planning model until the first error is smaller than a first threshold; and determine the updated first route planning model as the target route planning model of the target site, wherein the target route planning model is configured to output a trajectory of the vehicle for autonomous parking in the target site;

wherein the first route planning model is pre-trained based on a set of historical route data, the set of historical route data being associated with a plurality of sites different from the target site and comprising a plurality of first historical route data;

wherein the first route planning model is determined by:

in response to inputting the plurality of first historical route data into a first route planning sub-model, determining a second error between a predicted trajectory outputted by the first route planning sub-model and an actual trajectory corresponding to each first historical route data;

updating a parameter of the first route planning sub-model in a first gradient descent way until the second error is smaller than a second threshold; and determining the updated first route planning sub-model as the first route planning model;

wherein the at least one processor is further configured to:

obtain current route data of the target site by at least one sensor of the vehicle;

determine a trajectory for autonomous parking of the vehicle in the target site by inputting the current route data to the target route planning model; and control steers, throttles, and brakes of the vehicle based on the determined trajectory and park the vehicle in a predetermined parking space of the target site.

7. The apparatus of claim 6, wherein the first error is indicated by a target loss function corresponding to the target site, and the second error is indicated by a sum of target loss functions corresponding to the plurality of sites.

8. The apparatus of claim 6, wherein the set of historical route data further comprises a plurality of second historical route data, and the first route planning sub-model is determined by:

in response to inputting the plurality of second historical route data into an initial route planning model, determining a third error between a predicted trajectory outputted by the initial route planning model and an actual trajectory corresponding to each second historical route data; and update a parameter of the initial route planning model in a second gradient descent way until the third error is smaller than a third threshold; and determining the updated initial route planning model as the first route planning sub-model.

9. The apparatus of claim 6, wherein the at least one processor is further configured to:

obtain target route data associated with the target site; and obtain the target route data set based on the target route data and a route data translation model, the target route data set comprising at least the target route data.

10. The apparatus of claim 9, wherein the route data translation model comprises a set of route data translation sub-models, each of the set of route data translation sub-models corresponds to a different environmental condition, and the at least one processor is further configured to:

determine a target environmental condition where the target route data is located; and determine one route data translation sub-model from the set of route data translation sub-models corresponding to the target environmental condition based on the target environmental condition;

obtain the target route data set based on the target route data and the determined route data translation sub-model.

11. A non-transitory computer readable storage medium having computer instructions stored thereon, wherein the computer instructions are configured to cause a computer to execute a method for generating a target route planning model, the method comprising:

obtaining a target route data set associated with a target site; and in response to inputting target route data in the target route data set into a first route planning model, determining a first error between a predicted trajectory outputted by the first route planning model and an actual trajectory corresponding to the target route data;

updating a parameter of the first route planning model until the first error is smaller than a first threshold; and determining the updated first route planning model as a target route planning model of the target site, wherein the target route planning model is configured to output a trajectory of a vehicle for autonomous parking in the target site;

wherein the first route planning model is pre-trained based on a set of historical route data, the set of historical route data being associated with a plurality of sites different from the target site and comprising a plurality of first historical route data;

wherein the first route planning model is determined by:

in response to inputting the plurality of first historical route data into a first route planning sub-model, determining a second error between a predicted trajectory outputted by the first route planning sub-model and an actual trajectory corresponding to each first historical route data;

updating a parameter of the first route planning sub-model in a first gradient descent way until the second error is smaller than a second threshold; and determining the updated first route planning sub-model as the first route planning model;

wherein the method further comprises:

obtaining current route data of the target site by at least one sensor of the vehicle;

determining a trajectory for autonomous parking of the vehicle in the target site by inputting the current route data to the target route planning model; and controlling steers, throttles, and brakes of the vehicle based on the determined trajectory and parking the vehicle in a predetermined parking space of the target site.

12. The storage medium of claim 11, wherein the first error is indicated by a target loss function corresponding to the target site, and the second error is indicated by a sum of site loss functions corresponding to the plurality of sites.

* * * * *